(12) United States Patent
Grable

(10) Patent No.: US 9,658,308 B1
(45) Date of Patent: May 23, 2017

(54) SELF-CONTAINED, ELECTROMAGNETIC RADIATION OR SOLAR DRIVEN TRACKING DEVICE AND METHOD UTILIZING THERMAL TRANSPIRATION

(71) Applicant: Roland Grable, Vista, CA (US)

(72) Inventor: Roland Grable, Vista, CA (US)

(*) Notice: Subject to any disclaimer, the term of this patent is extended or adjusted under 35 U.S.C. 154(b) by 179 days.

(21) Appl. No.: 14/142,722

(22) Filed: Dec. 27, 2013

Related U.S. Application Data

(60) Provisional application No. 61/746,482, filed on Dec. 27, 2012.

(51) Int. Cl.
   *G01S 3/78* (2006.01)
   *G01S 3/786* (2006.01)

(52) U.S. Cl.
   CPC .................. *G01S 3/7861* (2013.01)

(58) Field of Classification Search
   CPC .................................................. G01S 3/7861
   See application file for complete search history.

(56) References Cited

U.S. PATENT DOCUMENTS 182,172 A * 9/1876 Crookes .................... G01J 1/04
                                                244/1 R

* cited by examiner

*Primary Examiner* — Tony Ko
(74) *Attorney, Agent, or Firm* — Arent Fox LLP

(57) ABSTRACT

Various aspects of apparatus and methods are disclosed. The apparatus includes a carrier have first and second portions extending in opposite directions from a carrier axis. The apparatus further includes first and second objects, the first object being carried by the first portion of the carrier and the second object being carried by the second portion of the carrier, wherein each of the first and second objects are configured to cooperatively rotate the carrier about the carrier axis by thermal transpiration to track an electromagnetic radiation source.

17 Claims, 3 Drawing Sheets

SELF-CONTAINED, ELECTROMAGNETIC RADIATION OR SOLAR DRIVEN TRACKING DEVICE AND METHOD UTILIZING THERMAL TRANSPIRATION

CROSS-REFERENCE TO RELATED APPLICATION

This Application claims priority from U.S. Provisional Patent Application No. 61/746,482, filed Dec. 27, 2012, the contents of which are hereby incorporated by reference herein in their entirety.

BACKGROUND

Field

The present disclosure relates to a device capable of tracking the sun or any electromagnetic radiation source by converting the electromagnetic radiation received from the sun or any source into kinetic energy by means of thermal transpiration within the presence of rarefied gases in a self-contained transparent environment.

Background

In an increasingly 'green energy' mindful society, obtaining solar energy in a more compact and efficient manner is highly desirable. Static or fixed type solar energy collectors are inefficient due to the fact that they do not track the sun. An optimal position for the collectors is selected based on a compromise between sun's latitudinal altitude in the summer and that in the winter. The sun's energy is usually strongest at midday and they are positioned to exploit this fact, thus most fixed collectors receive little or no solar energy in the morning or afternoon periods. Fixed solar energy collectors are however very reliable and require little maintenance because there are neither moving parts nor active components.

Solar energy collectors that track the sun greatly increase both efficiency and daily duration of time they are operational. There are many methods for solar tracking available; most require a power source and all are complex in nature, requiring a physically large collector for them to be cost effective. As the size of the collector increases to offset the cost of the solar tracking, the height, weight, wind load and footprint of the collector also increases. The larger the size, the more aesthetically objectionable the collector becomes. The weight will also limit where the collector can be installed and how difficult installation will become. All of these factors contribute a system that is not only expensive, but also requires high maintenance and knowledgeable service personnel.

Systems that require tracking for solar energy collection or for luminous target monitoring can expect complexity, maintenance and costs to increase rapidly as energy needs or monitoring increases. Accordingly, there is a need for a self-contained, electromagnetic radiation or solar driven tracking device that is individually replaceable, virtually eliminating all maintenance and complexity issues and providing level costs at any energy or monitoring need.

SUMMARY

Various aspects of apparatus and methods are disclosed. The apparatus includes a carrier having first and second portions extending in opposite directions from a carrier axis. The apparatus further includes first and second objects, the first object being carried by the first portion of the carrier and the second object being carried by the second portion of the carrier, wherein each of the first and second objects are configured to cooperatively rotate the carrier about the carrier axis by thermal transpiration to track an electromagnetic radiation source.

It is understood that other aspects of apparatus, articles of manufacture and methods will become readily apparent to those skilled in the art from the following detailed description, wherein various aspects of articles of manufacture and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatus and methods will now be presented in the detailed description by way of example, and not by way of limitation, with reference to the accompanying drawing, wherein.

DETAILED DESCRIPTION

Figure 1:
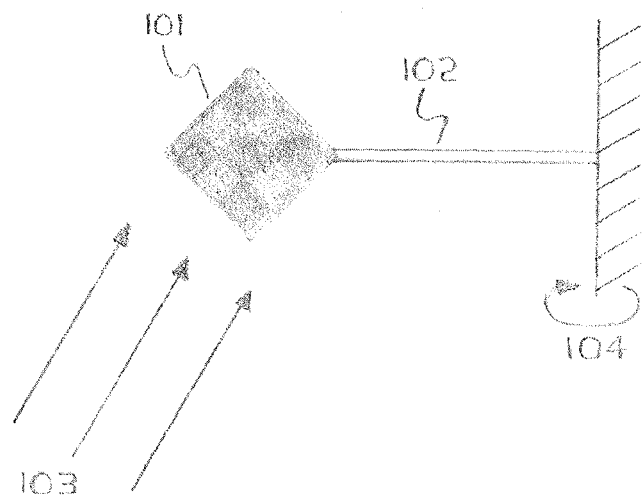
FIG. 1 is an exemplary embodiment of a lever arm experiencing torque induced by electromagnetic radiation by means of thermal transpiration.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

Various aspects of the present invention may be illustrated with reference to one or more exemplary embodiments. As used herein, the term 'exemplary' means 'serving as an example, instance, or illustration', and should not necessarily be construed as preferred or advantageous over other embodiments of the tracking apparatus disclosed herein.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises", "comprising,", "includes" and/or "including", when used herein, specify the presence of the stated features, integers, steps, operations, elements, and/or components, but do not preclude the presence or addition of one or more other features, integers, steps, operations, elements, components, and/or groups thereof.

In the following detailed description, various aspects of the present invention will be presented in the context of apparatus and methods used in solar tracking device using thermal transpiration. However, those skilled in the art will realize that these aspects may be extended to apparatus and methods. Accordingly, any reference to a specific tracking apparatus or method is intended only to illustrate the various aspects of the present invention, with the understanding that such aspects may have a wide range of applications.

The darker side of an object will experience a net force that will repel it from any electromagnetic radiation source it is subjected to. The theory that explains this phenomenon is referred to as 'thermal transpiration'. The forces involved in thermal transpiration are extremely small and do not become evident unless the object is in a rarefied gas, partial vacuum environment.

An exemplary embodiment of an 'object with a darker side' is a vane or plate which is black or darker on one side (black side) and is lighter or reflective on the other side (white side). For illustration purposes it will be square, flat and relatively thin. An optimal vane or plate is dependent upon many factors and may be quite different in size, shape, topology and thickness. The materials that comprise the vane or plate and the material used for the black side and the white side are also dependent upon many factors and are therefore not discussed here.

Figure 2:
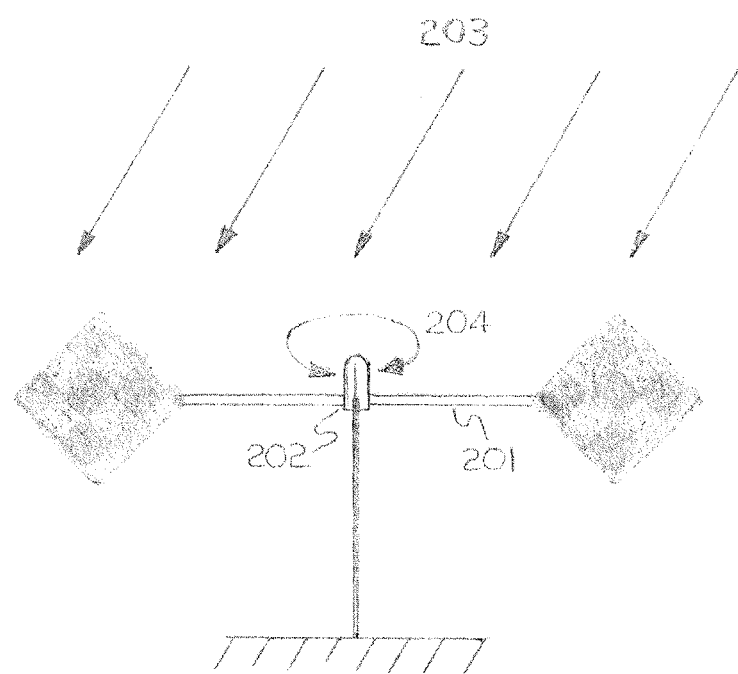
FIG. 2 is an exemplary embodiment of a system utilizing opposing induced torques to align with or track an electromagnetic radiation source by means of thermal transpiration.

As illustrated in FIG. 1, connecting a vane or plate 101 to a lever arm 102 and subjecting the black side to electromagnetic radiation 103 will cause the arrangement to experience a moment of force or torque 104 away from the radiation source. The more electromagnetic radiation that the cross sectional area of the black side of the vane or plate is exposed to, the more torque the arrangement will experience. If a second equal arrangement, as in FIG. 2, is connected opposite the first 201 about an axis of rotation 202 and both black sides face a source of electromagnetic radiation 203, any rotation 204 will cease when the two torques are equal and opposite. The vanes or plates should be partially shielded and/or tilted at angles that ensure the vane or plate closer to the electromagnetic radiation source will have a greater exposed cross sectional area than the axially opposed vane or plate and will therefore produce a greater torque component. Only when the opposing vanes or plates are equidistant from the electromagnetic source will the torques be equal. At this point the arrangement will face perpendicular to the electromagnetic radiation source and as the radiation source moves, the arrangement will rotate to preserve the torque equilibrium or in other words it will track the electromagnetic radiation source. One axis of rotation will allow tracking in one plane. To accomplish three dimensional tracking, a second axis perpendicular to the first axis's plane must be integrated into the arrangement. This arrangement is referred to as dual-axis tracking.

The tracking apparatus is encapsulated by a membrane that is transparent to electromagnetic radiation and is capable of containing a partial vacuum environment. Some or all of the material may have reflective, refractive, opaque or polarizing qualities. The composition of the material will also be dependent upon the external operating environment, the electromagnetic radiation spectrum of interest, and the desired size and shape of the enclosure. The shape shall be such as to facilitate electromagnetic radiation striking the apparatus' intended surfaces. The ideal vacuum for thermal transpiration is approximately 10 to the minus 2 torr; the range is from a few torr to 10 to the minus 6 torr. The rarefied gases present can be typical atmospheric gases or selected introduced gases. The vacuum level selected and the gases chosen will be application specific.

A prolonged partial vacuum environment which may be exposed to long periods of intense electromagnetic radiation presents many unique situations. A rarefied gas state will hinder heat transfer, but will virtually eliminate any oxidation concerns. The rate of outgassing increases with temperature because the vapor pressure and rate of chemical reactions increases. The outgassing properties of all materials used in the construction of the tracking apparatus must therefore be considered to ensure a partial vacuum environment over time.

The primary axis of the tracking apparatus will follow the electromagnetic radiation source about its azimuth or in the case of the sun, its east to west trek across the sky. The secondary axis will track the source's latitudinal position. This tracking method is referred to as Azimuth-Altitude Axis Tracking (AADAT). The attributes of AADAT tracking are well documented and thus will not be discussed here.

The tracking apparatus' primary axis of rotation should be parallel and balanced with respect to that of the gravitational field. This method ensures that there will be no perpendicular components of any gravitational forces acting on the primary axis. The secondary or altitude axis should also be balanced throughout its range of motion so as not to impart any torque component perpendicular to the rotation of the primary axis. The primary axis and all axes must be as frictionless as possible. It is important to minimize all extraneous forces since thermal transpiration forces are extremely small.

Figure 3:
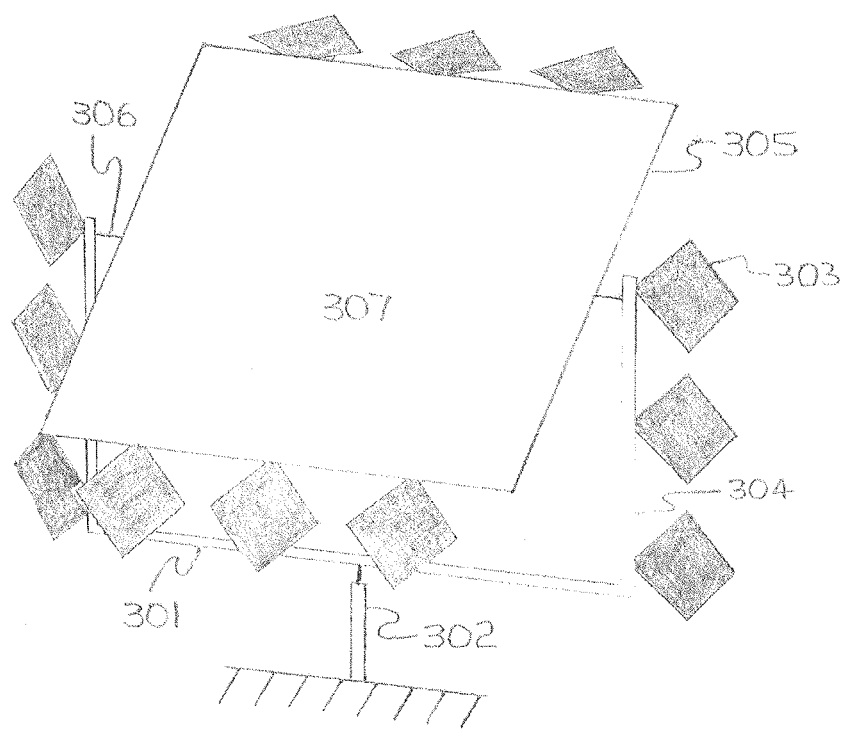
FIG. 3 is an exemplary embodiment of an electromagnetic radiation tracking apparatus by means of thermal transpiration.

FIG. 3 is an exemplary embodiment of how the tracking apparatus may be constructed. The azimuth axis of the tracking apparatus 301 will pivot on the base 302, with the vanes 303 mounted on the azimuth's vertical extensions 304. The altitude axis 305 will rotate perpendicular to the azimuth's axis with pivot points 306 on the vertical extensions. The flat area 307 on the altitude axis will track and be perpendicular to the electromagnetic radiation source. Incorporated within the flat area will be a 'solar cell' or sensor. Mounted in front of the flat area there may be a lens or other concentrating/redirecting device (not shown).

For solar tracking, an exemplary embodiment of a simpler tracking apparatus would have a fixed altitude angle or secondary axis determined by latitudinal location for installations further from the earth's equator. For installations nearer the earth's equator, perhaps within the tropics, the azimuth angle or primary axis can be fixed in an east/west orientation, thus tracking only the sun's altitude angle. Although less solar energy efficient, this approach should be less expensive and more durable and reliable, since the only one axis of rotation.

The above described exemplary embodiments require a 'solar cell' or sensor to be an integral part of the system, within the rarefied gas, partial vacuum environment. These exemplary embodiments should have a minimum of two electrical conductors to couple between a rotating and a stationary environment and to then exit the partial vacuum environment. Redirecting or channeling the tracked electromagnetic radiation to a stationary area at the base of the tracking apparatus' azimuth axis and outside of the partial vacuum environment allows for more flexibility. Two examples of redirecting or channeling are highly reflective curved conduits and bundled fiber optic strands.

Many aspects are to be considered when attempting to minimize friction within an axis, pivot or fulcrum. The alternatives described are for exemplary purposes only. The overall mass of the object acting on the axis, pivot or fulcrum must be kept to a minimum. The contact surfaces of the axis, pivot or fulcrum should be extremely hard and durable, and the cross sectional area of the contact surfaces should be minimal. Lubricants and other friction reducing materials should also be considered. A glass cone or hat pivoting on a hard metal point is one example. A magnetic arrangement, utilizing the attractive and/or the repulsive properties of magnets to produce an axis or pivot with no or very little physical contact area is another example. The axis or pivot can also be suspended from above by a near torsion-less suspension or a magnetic arrangement.

When tracking the sun or other source of electromagnetic radiation, the rotation of the tracking device can be extremely slow or may even be intermittent. Being that there are truly no frictionless surfaces, generating the initial forces necessary to move against a non frictionless surface requires larger forces and perpendicular forces. Vibration or randomly directed forces interjected into the tracking apparatus can greatly negate this non frictionless condition. As in FIG. 4, an arrangement of four vanes 401, connected to a common pivot 402, with the black sides all in the same angular direction will continually rotate when subjected to electromagnetic radiation and if mechanically linked to the tracking device will transmit vibrations to the axes, pivots and fulcrums.

The electromagnetic radiation source may initially be in a position such that the tracking apparatus' primary vanes or plates are not exposed to the radiation, rendering it unable to track. To overcome this condition, a secondary set of vanes or plates should be mounted to back of the tracking apparatus in such an arrangement as to develop the necessary rotation about the primary axis to allow the primary vanes or plates to be exposed to the electromagnetic radiation source. In the case of solar tracking, a magnet mounted on the tracking apparatus' primary axis can behave as a compass pointing the tracking apparatus to a neutral angle when the solar radiation is minimal or not present (night time). The neutral angle should be determined by the sun's zenith point, ensuring the primary vanes or plates will always be exposed to sun's radiation.

Figure 4:
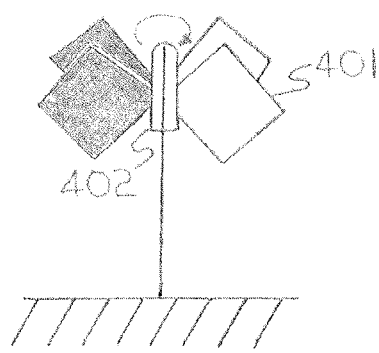
FIG. 4 is an exemplary embodiment of a vibration generator driven by electromagnetic radiation by means of thermal transpiration.
Figure 5:
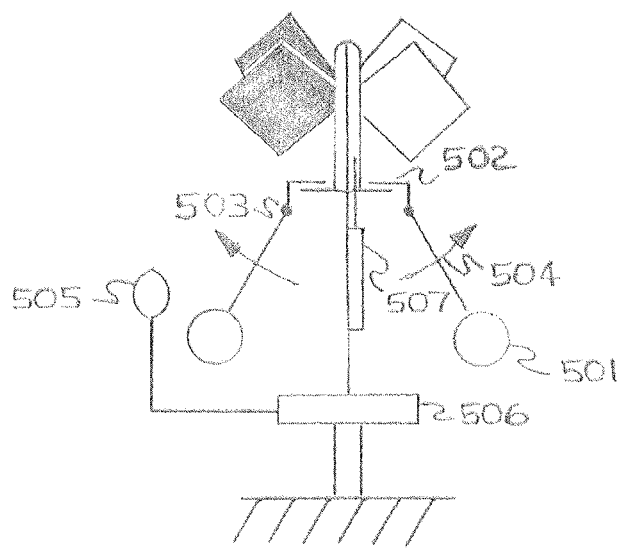
FIG. 5 is an exemplary embodiment of a more rugged method for an azimuth axis electromagnetic radiation tracking apparatus.

Another method for tracking electromagnetic radiation that is more robust and rugged, is to utilize an arrangement such as that in FIG. 4 incorporating a number of vanes with all dark sides arranged in the same direction and mounted via lever arms to an axis of rotation. As illustrated in FIG. 5, if two or more balanced, relatively massive objects 501 are coupled to this rotating axis through a near frictionless surface 502, kinetic energy can be transferred incrementally and continuously to the objects, without abruptly altering the rotation of the vanes. If the objects are connected by means of a hinged or flexible lever arm 503 and as the rotation and kinetic energy increases, the objects by means of centrifugal force will move outwards and upwards against gravity 504. If the motion goes far enough it will come in contact with a target 505 that is linked to a ratcheting device 506, transferring the accumulated kinetic energy by means of an impact. The impact or collision force will incrementally rotate an azimuth pointing device. The rotating vanes will again impart more and more kinetic energy to the objects until another impact occurs. This scenario will continue until the rotating vanes move the azimuth pointing device and an integrated mechanical thermostat device 507 to face the electromagnetic radiation. At this point the electromagnetic radiation will heat the mechanical thermostat device causing it to deflect enough so as to inhibit the vanes rotation, and thus to inhibit the pointing device from ratcheting further. The pointing device will not rotate further until the electromagnetic radiation's azimuth path travels beyond the exposed mechanical thermostat device, allowing it to cool and again repeat the scenario. A shade that blocks the rotating vanes from electromagnetic radiation when the pointing device faces the source of the radiation can also be used to inhibit the ratcheting device's azimuth rotation.

The altitude tracking can be accomplished in a similar manner; rotating vanes can cause an object to impact a target that in turn ratchets a pointing device through the electromagnetic radiation's altitude path. An integral mechanical thermostat device will only be exposed and thus heated when the pointing device faces the radiation source. At this point the mechanical thermostat device will deflect, inhibiting further rotation of the vanes, thus ceasing any further ratcheting. Only when the electromagnetic radiation's altitude changes will the mechanical thermostat device cool, allowing the vanes to again rotate, causing further ratcheting of the pointing device.

A solar cell, reflectors, refractors, lenses, or any other device may be mounted to this pointing device, with everything contained within the vacuum environment. The mechanical coordinates of the azimuth and altitude can also be transferred externally by means of magnets, influencing objects through the vacuum environment's membrane.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:
1. An apparatus comprising:
a carrier having first and second vertical portions positioned on opposing sides of a primary axis; and
a first plurality of objects carried by the first and second vertical portions, and configured to cooperatively rotate the carrier about the primary axis to track an azimuth of an electromagnetic radiation source.

2. The apparatus of claim 1, further comprising:
a flat object coupled to the vertical portions and positioned along a secondary axis that is perpendicular to the primary axis; and
a second plurality of objects configured to cooperatively rotate the flat object about the secondary axis to track an altitude of the electromagnetic radiation source.

3. The apparatus of claim 2, wherein each object of the first and second pluralities of objects comprises a first side and an opposing second side, wherein the first side is darker than the second side, and wherein the first side is configured to experience a repelling force in response to the electromagnetic radiation source.

4. The apparatus of claim 2, wherein the flat object is configured to track the altitude of the electromagnetic radiation source by rotating about the secondary axis as the electromagnetic radiation source moves such that the second plurality of objects are continuously facing the electromagnetic radiation source.

5. The apparatus of claim 2, wherein first and second objects of the second plurality of objects are mounted to the flat area on opposite sides of the secondary axis.

6. The apparatus of claim 5, wherein the first and second objects of the second plurality of objects are configured to experience first and second torques respectively.

7. The apparatus of claim 6, wherein the flat object is configured to stop rotation when the first and second torques are equal and opposite.

8. The apparatus of claim 6, wherein the flat object is configured to rotate so long as the first and second torques are unequal.

9. The apparatus of claim 6, wherein the flat object is configured to be perpendicular to the electromagnetic radiation source when the first and second torques are equal and opposite.

10. The apparatus of claim 2, wherein the second plurality of objects is configured to rotate the flat object about the secondary axis in a direction away from the electromagnetic radiation source.

11. The apparatus of claim 2, wherein the flat object comprises at least one of a solar cell, reflector, refractor, and lens.

12. The apparatus of claim 2, wherein the first plurality of objects are configured to face a direction of the electromagnetic radiation source, and wherein the carrier is further configured to track the azimuth of the electromagnetic radiation source by rotating about the primary axis as the electromagnetic radiation source moves such the first plurality of objects is continuously facing the electromagnetic radiation source.

13. The apparatus of claim 1, wherein at least one object carried by the first or second vertical portions is configured to rotate the carrier about the primary axis in a direction away from the electromagnetic radiation source.

14. The apparatus of claim 1, wherein the objects carried by the first and second vertical portions are configured to experience first and second torques respectively.

15. The apparatus of claim 14, the carrier is configured to stop rotation when the first and second torques are equal and opposite.

16. The apparatus of claim 14, wherein the carrier is configured to rotate so long as the first and second torques are unequal.

17. The apparatus of claim 14, wherein the objects carried by the first and second vertical portions face the electromagnetic radiation source when the first and second torques are equal and opposite.

* * * * *